Oct. 31, 1950  R. N. YOUNGBLOOD  2,527,612
APPARATUS FOR DETERMINING HARDNESS
Filed Jan. 17, 1947
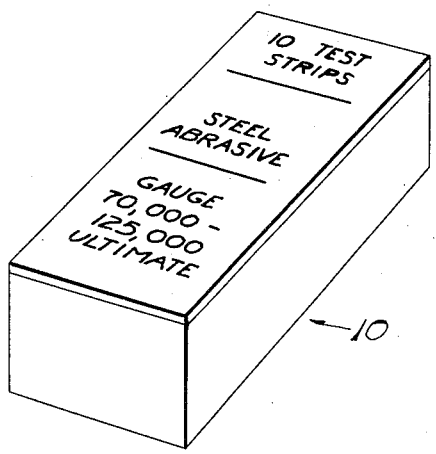
Fig. 1.
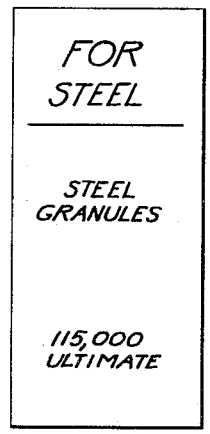
Fig. 2.
Fig. 3.
INVENTOR
Robert N. Youngblood
BY
Beau, Brooks, Buckley & Beau.
ATTORNEYS Patented Oct. 31, 1950

2,527,612

UNITED STATES PATENT OFFICE 2,527,612

APPARATUS FOR DETERMINING HARDNESS

Robert N. Youngblood, Snyder, N. Y.

Application January 17, 1947, Serial No. 722,615

3 Claims. (Cl. 73—78)

This invention relates to means for determining the ultimate tensile strength of materials.

It is well recognized by metallurgists that there is a very close correlation between the hardness of a metal and its ultimate tensile strength. Much research and investigation has been performed upon this point and tables have been published from which hardness figures, determined upon an empirical scale, can be translated into ultimate tensile strength.

At present, there are two principal empirical systems for determining the hardness of metals, each depending upon its specific equipment for obtaining relative figures within the given system. These devices are:

a. A precision measuring device which measures either the depth or the diameter of an impression made in the piece tested by an infinitely hard point of regular geometric shape impressed upon the work piece by a controlled force.

b. A measuring device which measures the rebound of an object of specific substance and shape when dropped freely under controlled conditions upon the piece to be tested.

The machines in the above categories are quite elaborate and expensive and are to be found only in central testing laboratories; they are not devices readily available to the everyday machinist. The measuring devices in group (a) above are so elaborate as generally to be non-portable and although group (b) machines may be portable, they are quite costly and not as accurate as those of group (a).

In the prior methods of testing, best measurements are obtained upon a sample of the metal, rather than upon a finished article, which presupposes identity between the sample and the actual metal article, the hardness and strength of which is desired. Furthermore, it is impossible to determine the hardness of certain interior shapes or of small sizes and special configurations. In many instances, the hardness of a finished machined part cannot be obtained by the available procedures as the finished surface will be either destroyed or marred.

It is an object of the present invention to determine the hardness and ultimate tensile strength of materials by a simple, portable tester which does not mar the surface of finished and machined metal articles.

It is an object of the invention to provide a series of calibrated testing devices for determining the hardness of metals.

It is also an object of the invention to provide means for determining the hardness and the ultimate tensile strength of the interior surfaces and small parts not testable by conventional hardness testing devices.

In accordance with the present invention, a series of flexible strips having upon one side thereof granules of metal of a known hardness, increasing from the initial member in the series, are provided as the testing means. The work piece whose hardness and therefore tensile strength is to be determined is tested for "scratchability" by each member in the series until one is found which just scratches the surface of the work piece. The hardness of the piece is therefore between the hardness of the metal in that strip of the series and the next preceding member which did not produce a scratch upon the surface of the piece.

These test pieces are preferably made by attaching granules of a metal of known hardness to a flexible backing sheet. The granules are attached to the backing sheet by any suitable cement or bonding material which may be either an inorganic or organic cement, preferably the latter, of either thermoplastic or thermosetting characteristics. The backing sheet may be any sheet material, unified, matted or woven, such as paper, cloth or other suitable flexible substance capable of carrying the metal granules thereon.

The granules are relatively finely divided particles of a metal of known hardness characteristics and a given test strip contains granules thereon of the same hardness. A particular strip is designated to possess a particular and specified hardness either by reason of scratch calibration against a standard test piece of known hardness, or by selection of the granules from a metal piece of the specified and desired hardness.

In testing steels, therefore, a series of strips, provided with steel granules thereon, having a successively increased hardness from one member of the series to the next succeeding member, say in hardness differences equivalent to 5,000 lb. increments in ultimate tensile strength, is particularly well adapted for this purpose, while the testing of other metals, such as the phosphor bronzes, is best done with a series of test strips of the same metal in a series of known and increasing hardnesses, and so on for any material tested.

The metal granules may be made in any fashion which tends to produce granules of uniform characteristics. Where the granules are made from a metal piece of known hardness it is best to produce them by means of a wet hacksaw process. There is in such case almost complete identity between the chips and the original bar being sawed, and the chips are of a highly uniform size and hardness. It will be of course understood that any other method of making the chips can be employed and the invention is not restricted to the described hacksaw method.

Although I have obtained best results by using as test strips those which contain granules of characteristics similar to the piece to be tested, good results are also obtainable by employing strips having granules of chemical characteristics different from the piece to be tested provided, however, that care has been taken to obtain an exact calibration of such different material of the test strips throughout the range possessed by the material to be tested.

The series of strips are best marketed by assembling a convenient number thereof to provide a desired range for testing, and distributing the assembled strips in a container on which the range and type of granule is marked. East test strip also indicates the type of granule and strength thereof.

Thus—

Fig. 1 is a view in perspective of a container for the strips while

Fig. 2 represents an individual test strip and

Fig. 3 shows the granules cemented upon a backing sheet.

The container 10 is filled with test strips 11. The strips 11 are of any convenient size, say ½" x 3", and are preferably made of sheet material 12 on which the granules 13 are cemented.

The granules 13 are of uniform size and hardness and are preferably of about the same composition as the material to be tested.

What is claimed is:

1. A set of standards for determining characteristics of a material related to tensile strength which comprises a series of strips of sheet material, each strip of said set having bonded thereto on one side thereof granules of material of known tensile strength, the granules of each strip having a tensile strength increasing progressively from that of the first strip of the series, each strip of the series having marked on the other side thereof the type of granule and the hardness or ultimate tensile strength thereof.

2. A set of standards for determining characteristics of a material related to tensile strength which comprises a series of strips of sheet material, each strip of said set having well defined projections extending outwardly from the strip, said projections being of material of known tensile strength, the material of the projections of each strip having a tensile strength increasing progressively from that of the first strip of the series, each strip of the series having marked on one side thereof the hardness or ultimate tensile strength of the material of the projections.

3. A set of standards for determining characteristics of a material related to tensile strength which comprises a series of strips of sheet material, each strip of said set having integral therewith a series of projections of known tensile strength, the projections of each strip having a tensile strength increasing progressively from that of the first strip of the series, each strip of the series having marked on one side thereof a notation characteristic which the user desires to determine.

ROBERT N. YOUNGBLOOD.

REFERENCES CITED

The following references are of record in the file of this patent:

UNITED STATES PATENTS

| Number | Name | Date |
|---|---|---|
| 774,444 | Mitchell | Nov. 8, 1904 |

FOREIGN PATENTS

| Number | Country | Date |
|---|---|---|
| 564,541 | Germany | Nov. 19, 1932 |

OTHER REFERENCES

Circular No. 228 of Paint Mafg. Ass'n. of the U. S., issued Mar. 1928, page 198. (Copy in class 73–150 of U. S. Pat. Off.)